Jan. 17, 1933.  E. A. RUSSELL ET AL  1,894,360
VAPOR REGULATOR
Filed Oct. 9, 1931
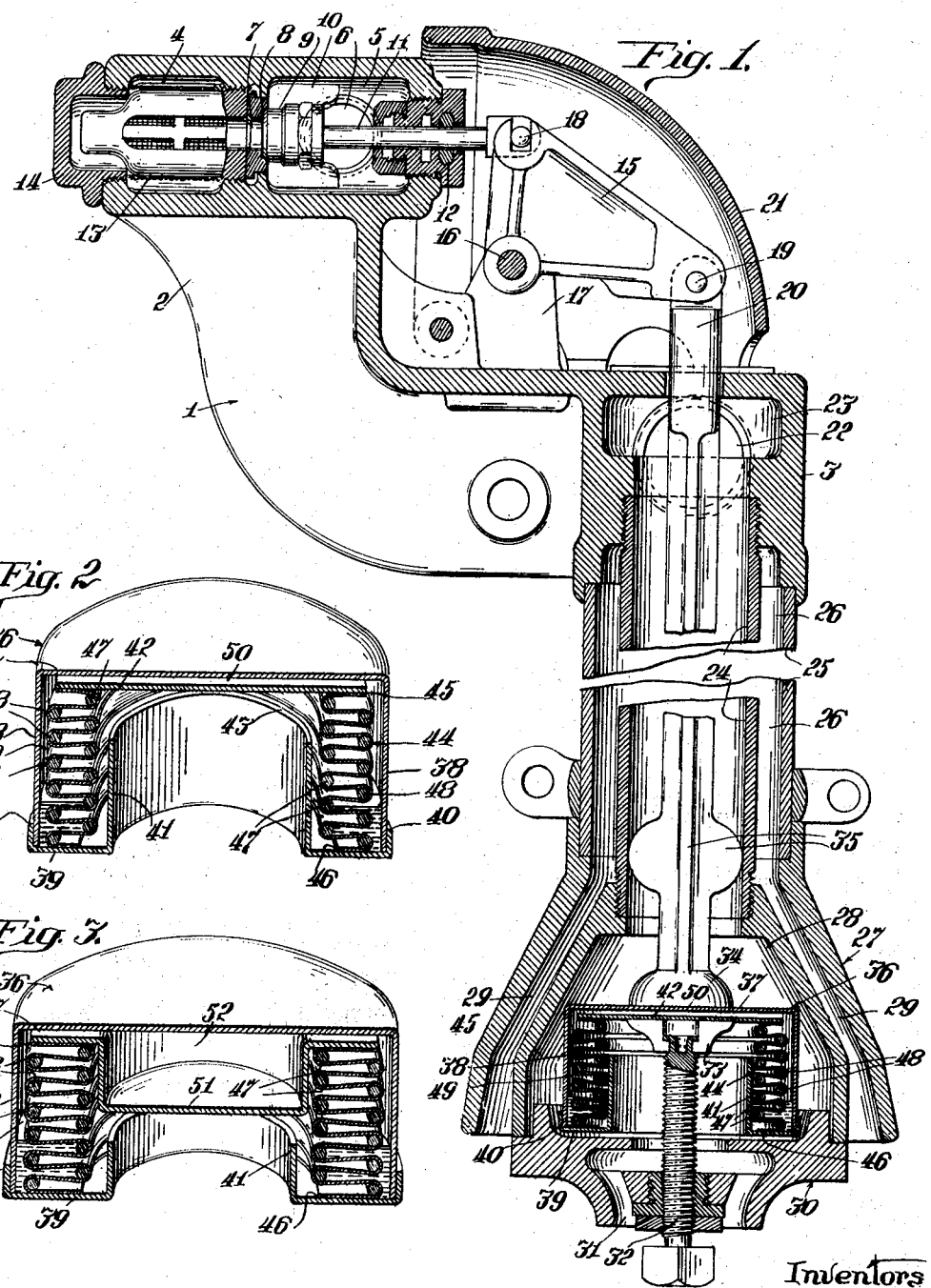
Inventors
*Edward A. Russell*
and *Paul B. Parks*
By 
Attorneys.

Patented Jan. 17, 1933

1,894,360

UNITED STATES PATENT OFFICE

EDWARD A. RUSSELL, OF CHICAGO, AND PAUL B. PARKS, OF OAK PARK, ILLINOIS, ASSIGNORS TO VAPOR CAR HEATING COMPANY, INC., OF CHICAGO, ILLINOIS, A CORPORATION OF NEW YORK

VAPOR REGULATOR

Application filed October 9, 1931. Serial No. 567,890.

This invention relates to certain new and useful improvements in a vapor regulator for controlling the flow of vapor or steam to the radiators of a railway car heating system, and more particularly to improvements in the thermostatic operating mechanism of such a vapor regulator.

Vapor regulators of this type, which are well known in the art, comprise a valve located in the steam supply line, and a thermostatic element for controlling the valve, said thermostatic element being subject to the temperatures of the fluids returned from the radiators. The vapor regulator is usually positioned beneath the car and the thermostatic element is substantially enclosed in a housing through which the returned steam, air and some of the condensate passes before flowing out through an opening in the lower end of the housing. This housing serves to enclose the thermostatic element in a surrounding envelope of the returned fluid so that it will promptly respond to the temperature thereof.

According to the present invention, the thermostatic element is of an improved form comprising an outer casing of an inverted cup-shape, a bottom plate movable within the cup shaped member, and an expansible bellows of corrugated sheet metal connecting the bottom plate with the lower edge of the inverted cup shaped member, the closed space confined between these members holding a certain amount of heat responsive fluid which will expand when the thermostatic element is heated so as to necessitate an increase in volume of the space between the members, thus forcing the bottom plate downwardly within the cup shaped member and contracting the bellows. Means are provided for limiting the movement of the bottom plate in both directions so as to prevent over expansion or contraction of the flexible bellows.

The principal object of this invention is to provide certain new and useful improvements in a vapor regulator, such as briefly referred to hereinabove and disclosed more in detail in the specifications which follow.

Another object is to provide an improved thermostatic assembly for a vapor regulator, in which the expansible bellows is housed and protected in such a manner that it is shielded from the condensate and there will be no substantial accumulation of condensate between the corrugations of the bellows.

Another object is to provide an improved thermostatic element for the vapor regulator in which excessive expansion or contraction of the bellows is prevented.

Other objects and advantages of this invention will be more apparent from the following detailed description of one approved form of apparatus embodying the principles of this invention.

In the accompanying drawing:

Fig. 1 is a central vertical section through the complete vapor regulator.

Fig. 2 is a sectional perspective view of the improved thermostatic element.

Fig. 3 is a view similar to Fig. 2 showing a modified form of thermostatic element.

The main casting or supporting frame 1 of the vapor regulator comprises an upwardly extending arm 2, in which the high and low pressure supply chambers are formed, and a horizontally projecting arm 3 from which the thermostat assembly is supported. In the arm 2 is formed a high pressure supply chamber 4 having a pipe connection (not here shown) with the source of steam supply, and a low pressure steam chamber 5, from which a conduit leads from port 6 to the heating system within the car. The steam passage 7 between the chambers 4 and 5 has a valve seat 8 at its outlet end with which cooperates a valve member 9 movable between guides 10 and carried by the valve stem 11, which projects through a packing 12 in one end of the low pressure chamber 5. A strainer 13 within the high pressure chamber 4 is held in place by a closure plug 14.

A bell-crank lever 15 is pivoted at 16 on a fixed bracket 17 formed on frame 1, and has a pin and slot connection at 18 with the outer end of valve stem 11. The other arm of the bell-crank lever is pivotally connected at 19 with the upper end of an operating rod 20 which projects down into the thermostat housing, as hereinafter described. A removable guard or casing 21 serves to shield and protect the lever mechanism connecting operating rod 20 with the valve stem 11.

A return pipe from the radiators within the car is connected into an inlet port 22 leading into chamber 23 formed in the arm 3 of casting 1. An inner tube 24 and a concentric outer tube 25 extend downwardly from the arm 3. The condensate flowing in from the heating system through port 22 drains down through the annular space 26 formed between the inner and outer tubes, but the greater portion of the returned steam or hot gases flow down through the inner tube 24 around the rod 20, which latter is so formed as to offer as little resistance as possible to the flow of fluids through the tube 24.

The lower ends of the tubes 24 and 25 are connected with a lower bell-shaped casting 27. The inner tube 24 leads down into a thermostat-housing chamber 28 which is entirely closed, except for the open lower end and for the connection at the upper end with tube 24. The annular space 26 between the tubes 24 and 25 connects with drain passages 29 formed outside of the thermostat chamber 28. A removable closure member, indicated as an entirety at 30, is removably secured to the lower end of the housing 27 so as to substantially close the thermostat chamber 28 except for a restricted outlet passage for the fluids returned to said chamber from the heating system, said outlet being indicated generally at 31. A supporting post in the form of an adjustable screw 32 is mounted centrally in the closure member 30, and carries a head 33 at its upper end upon which the thermostatic member, hereinafter described, is supported. A head 34 formed at the lower end of operating rod 20 rests upon the upper side of the thermostatic member, and a plurality of rounded projections 35 on the sides of rod 20 serve to loosely guide this rod for its vertical movements through the inner tube 24.

The improved thermostatic element comprises an outer casing in the form of an inverted cup-shaped member 36 having a substantially flat top wall 37 and a depending cylindrical side wall 38. A bottom annular closure plate 39 is secured at its outer edge to the lower edge of the depending cylindrical wall 38 of the cup shaped member in any suitable manner, as by soldering together the overlapping walls at 40. The plate 39 is provided with an inner upstanding annular or cylindrical flange 41 which projects upwardly within the cup shaped member 36, concentric with the outer cylindrical wall 38. This annular flange 41 is of somewhat less height than the outer cylindrical wall 38, for reasons hereinafter brought out. A circular metallic bottom plate 42 is movable vertically within the cup shaped member 36 between the top 37 thereof and the upper edge 43 of annular flange 41. In the annular space between the cylindrical walls 38 and 41 is positioned an annular corrugated metallic bellows 44 which is secured at its upper end 45, as by soldering, to the movable bottom plate 42, and which is secured in a similar manner at its lower end 46 to the annular closure plate 39. The lower end of the bellows might be secured to the side wall 38 of the cup shaped member adjacent the lower edge thereof. Preferably wire rings or other annular filler members 47 and 48 are inserted in the looped edge portions of the metallic bellows 44, between the successive overlapping corrugations thereof, so as to space these members apart and avoid breakage by an undue flattening of the corrugations.

It will be noted that a closed receptacle is formed including the substantially annular space 49 between the bellows and the side wall 38 of the cup shaped member, and also the space 50 between the top 37 of the cup shaped member and the movable bottom plate 42. In this space is confined a suitable amount of a heat responsive fluid which expands or contracts in accordance with the temperatures to which the thermostatic element is subjected. As the fluid expands, the volume of the chamber formed within the thermostatic element must increase, and this is accomplished by a downward movement of bottom plate 42 away from the top plate 37 of the cup shaped member, the bellows 44 contracting. This downward movement of bottom plate 42 is limited by the engagement of this plate with the upper edge 43 of the inner cylindrical flange 41, so that the flexible bellows cannot be compressed sufficiently to cause injury thereto. As the temperature to which the thermostatic element is subjected is lowered, the volume required for the thermostatic fluid will be decreased and the plate 42 will move upwardly, this movement being limited by engagement with the top 37 of the cup-shaped member. In this way the expansion of the flexible bellows is limited. It will thus be seen that it is impossible to either expand or contract the bellows beyond certain fixed limits.

In the modified form shown in Fig. 3, the movable bottom plate is formed with a central downwardly dished portion 51, thereby forming a space 52 which increases the fluid-holding capacity of the thermostatic chamber. The flange 41 is correspondingly decreased in height, and is of somewhat smaller diameter than the diameter of the dished portion 51 of the bottom plate so that this portion 51 will engage the upper edge of flange 41 to limit the expansion of the thermostatic element. The operation of this form of the thermostatic element is the same as that of the form first described.

Referring now to the general operation of the improved vapor regulator, when the system is cold and there is little or no steam in the thermostat housing 28, the thermostatic member will be contracted, as shown in Fig. 1. The bottom plate 42 rests on the head 33 supported by adjusting screw 32, and the head 34 at the lower end of operating rod 20 rests on the top plate 37 of the theremostatic member. The bottom plate 42 and top plate 37 are in contact or closely adjacent one another. At this time the valve 9 will be in open position so that steam can flow freely from the source of supply through the inlet chamber 4 and passage 7 into the outlet chamber 5 and thence to and through the radiators. When the radiating system has become filled with steam, excess steam will flow back through port 22 and downwardly through the inner pipe 24 so as to fill the thermostat chamber 28. This surrounding envelope of steam will heat the thermostatic element, causing the fluid therein to expand, thus causing the plates 42 and 37 to separate. Since the movable plate 42 is held against actual downward movement by the head 33 on the supporting post 32, the cup shaped member 36 will be forced to move upwardly relative to the bottom plate 42, thereby lifting the operating rod 20, and through the bell-crank lever 15 and valve stem 11, moving valve 9 to closed position, thus cutting off the further flow of steam to the radiators. As the steam condenses, the gases in chamber 28 will become lower in temperature and the thermostatic element will again contract, permitting the plates 42 and 37 to move closer together, thus lowering the operating rod 20 and permitting the valve 9 to open. Additional steam will then flow into the radiators. This process will be repeated at intervals so as to keep the radiating system full of steam.

It will be noted that the expansible bellows 44 is almost completely enclosed by the sheet metal casing 36 and the closure plate 39 and inner cylindrical flange 41, so that it is amply protected against injury when being installed or replaced, and is largely shielded from condensate flowing through or forming in the thermostat-receiving chamber 28. Any liquids flowing through or forming in this chamber will flow over the substantially smooth outer surface of the inverted cup shaped member 36 and thence pass out through the outlets 31. In this manner the accumulation of condensate on the flexible bellows is minimized.

We claim:

1. In a vapor regulator for railway car steam heating systems, a valve for controlling the steam flow to the heating system, a substantially closed housing having a fluid inlet in its upper portion and a restricted outlet in its lower portion, means for delivering fluids returned from the heating system into the housing, an operating rod projecting from the housing for moving the valve, a supporting post adjustably mounted in the lower portion of the housing and in substantial alignment with the rod, and a thermostatic member within the housing and comprising an inverted cup-shaped member the top of which supports the rod, a bottom plate movable within the cup-shaped member and resting on the post, an annular corrugated bellows connecting the outer portion of the plate with the lower edge portion of the cup-shaped member, and an expansible fluid confined in the closed space between the cup-shaped member, plate and bellows.

2. In a vapor regulator for railway car steam heating systems, a valve for controlling the steam flow to the heating system, a substantially closed housing having a fluid inlet in its upper portion and a restricted outlet in its lower portion, means for delivering fluids returned from the heating system into the housing, an operating rod projecting from the housing for moving the valve, a supporting post adjustably mounted in the lower portion of the housing and in substantial alignment with the rod, and a thermostatic member within the housing and comprising an inverted cup-shaped member the top of which supports the rod, a bottom plate movable within the cup-shaped member and resting on the post, an annular corrugated bellows connecting the outer portion of the plate with the lower edge portion of the cup-shaped member, an annular closure plate secured to the lower edge of the cup-shaped member and having an upwardly projecting annular flange within the bellows, and an expansible fluid confined in the closed space between the cup-shaped member, plate and bellows, the plate engaging the upwardly projecting flange to limit its movement away from the top of the cup-shaped member when the fluid is heated and expands.

3. In a vapor regulator for railway car steam heating systems, a valve for controlling the steam flow to the heating system, a substantially closed housing having a fluid inlet in its upper portion and a restricted outlet in its lower portion, means for delivering fluids returned from the heating system into the housing, an operating rod projecting from the housing for moving the valve, a supporting post adjustably mounted in the lower portion of the housing and in substantial alignment with the rod, and a thermostatic member within the housing and comprising an inverted cup-shaped member the top of which supports the rod, a bottom plate movable within the cup-shaped member and resting on the post, an annular corrugated bellows connecting the outer portion of the plate with the lower edge portion of the cup-shaped member, an annular closure plate secured to the lower edge of the cup-shaped member and having an upwardly projecting annular flange within the bellows, and an expansible fluid confined in the closed space between the cup-shaped member, plate and bellows, the expansion and contraction of the bellows being limited respectively by the engagement of the plate with the top of the cup-shaped member and with the upwardly projecting annular flange.

4. In a vapor regulator for railway car steam heating systems, a valve for controlling the steam flow to the heating system, a substantially closed housing having a fluid inlet in its upper portion and a restricted outlet in its lower portion, means for delivering fluids returned from the heating system into the housing, an operating rod projecting from the housing for moving the valve, a supporting post adjustably mounted in the lower portion of the housing and in substantial alignment with the rod, and a thermostatic member within the housing and comprising an inverted cup-shaped member the top of which supports the rod, a bottom plate movable within the cup-shaped member and resting on the post, an annular corrugated metallic bellows connecting the outer portion of the plate with the lower edge of the cup-shaped member, and reinforcing rings confined between the overlapping corrugations of the bellows, and an expansible fluid confined in the closed space between the cup-shaped member, plate and bellows.

5. In a vapor regulator for railway car steam heating systems, a valve for controlling the steam flow to the heating system, a substantially closed housing having a fluid inlet in its upper portion and a restricted outlet in its lower portion, means for delivering fluids returned from the heating system into the housing, an operating rod projecting from the housing for moving the valve, a supporting post adjustably mounted in the lower portion of the housing and in substantial alignment with the rod, and a thermostatic member within the housing and comprising an inverted cup-shaped member the top of which supports the rod, a bottom plate movable within the cup-shaped member and resting on the post, an annular closure plate secured to the lower edge of the cup-shaped member and having an upwardly projecting annular flange extending into the cup-shaped member in spaced relation from the sides thereof, an expansible annular corrugated bellows positioned in the annular space between the flange and the cup-shaped member and secured at its upper end to the top of the cup-shaped member and secured at its lower end to the annular closure plate, and an expansible fluid confined in the space between the cup-shaped member, bellows and bottom plate, the expansion and contraction of the bellows being limited respectively by the engagement of the bottom plate with the top of the cup-shaped member and with the upwardly projecting annular flange.

EDWARD A RUSSELL.
PAUL B. PARKS.